(12) United States Patent
Shizuka et al.

(10) Patent No.: US 7,028,173 B2
(45) Date of Patent: Apr. 11, 2006

(54) DEVICE ENVIRONMENT CONFIGURATION SYSTEMS, DEVICE ENVIRONMENT CONFIGURATION METHODS, AND DATA STORAGE MEDIA THEREFOR

(75) Inventors: Sachie Shizuka, Toubu-machi (JP); Atsushi Kobayashi, Maruko-machi (JP); Masahiro Katagiri, Misato-mura (JP)

(73) Assignee: Seiko Epson Corporation, Tokyo (JP)

( * ) Notice: Subject to any disclaimer, the term of this patent is extended or adjusted under 35 U.S.C. 154(b) by 663 days.

(21) Appl. No.: 10/047,445

(22) Filed: Jan. 9, 2002

(65) Prior Publication Data
US 2002/0095527 A1 Jul. 18, 2002

(30) Foreign Application Priority Data
Jan. 16, 2001 (JP) ............................. 2001-007912

(51) Int. Cl.
*H04M 3/00* (2006.01)
(52) U.S. Cl. ........................................................ 713/1
(58) Field of Classification Search ...................... 713/1
See application file for complete search history.

(56) References Cited

U.S. PATENT DOCUMENTS 6,633,977 B1 * 10/2003 Hamilton et al. ........... 713/100
6,792,557 B1 * 9/2004 Takamoto et al. ............. 714/7
6,842,835 B1 * 1/2005 Fujimoto et al. ........... 711/162
6,938,137 B1 * 8/2005 Fujibayashi et al. ....... 711/162
2002/0147938 A1 * 10/2002 Hamilton et al. .............. 714/6
2003/0149830 A1 * 8/2003 Torr et al. .................. 711/100

FOREIGN PATENT DOCUMENTS

| JP | 07-160351 | 6/1995 |
| JP | 07-271560 | 10/1995 |

* cited by examiner

Primary Examiner—John R. Cottingham
(74) Attorney, Agent, or Firm—Hogan & Hartson, L.L.P.

(57) ABSTRACT

Device environment configuration systems, methods, and data storage media are provided that are adapted to automatically replicate device environment configuration information in a developer system to one or more other client systems. The user settings in OPOS device environment configuration settings of the developer PC can be found. Control objects and service objects stored to a data storage medium can then be installed to a client PC based on these user settings, and the OPOS device environment configuration settings from the developer PC can then be added to the client PC registry. Specific information stored in the client PC registry can be obtained based on the hardware specifications, such as the devices connected to the client PC and the connection port, and terminal-specific settings can be compiled for overwriting to the OPOS device environment configuration settings. These terminal-specific settings can then be stored to the OPOS device environment configuration settings in the registry of the client PC.

40 Claims, 11 Drawing Sheets

IDENTIFICATION NUMBER: PRODUCT ID,
SUPPORTED LANGUAGES

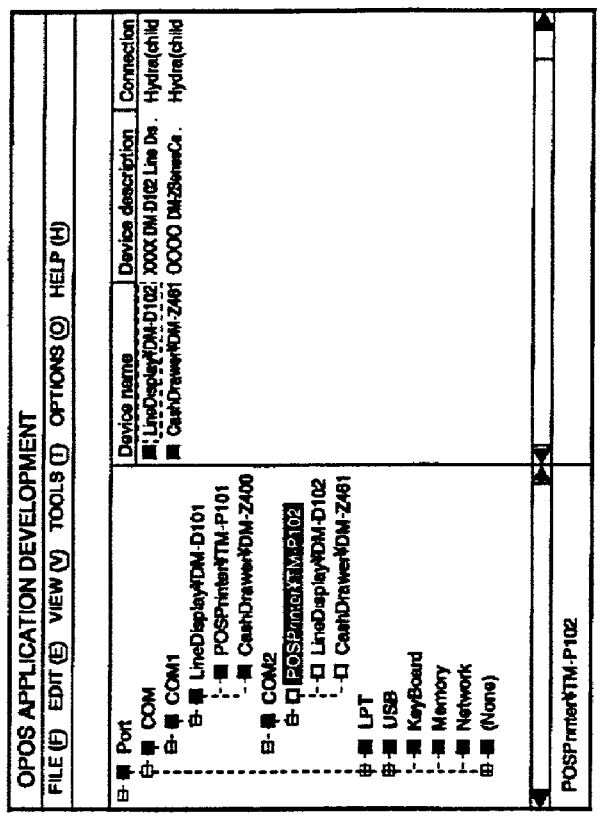
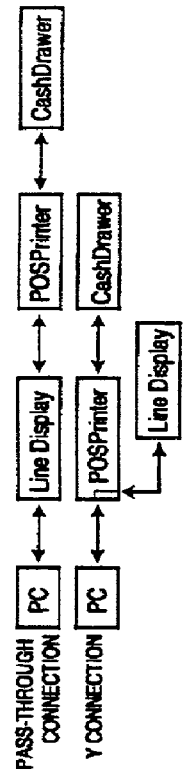
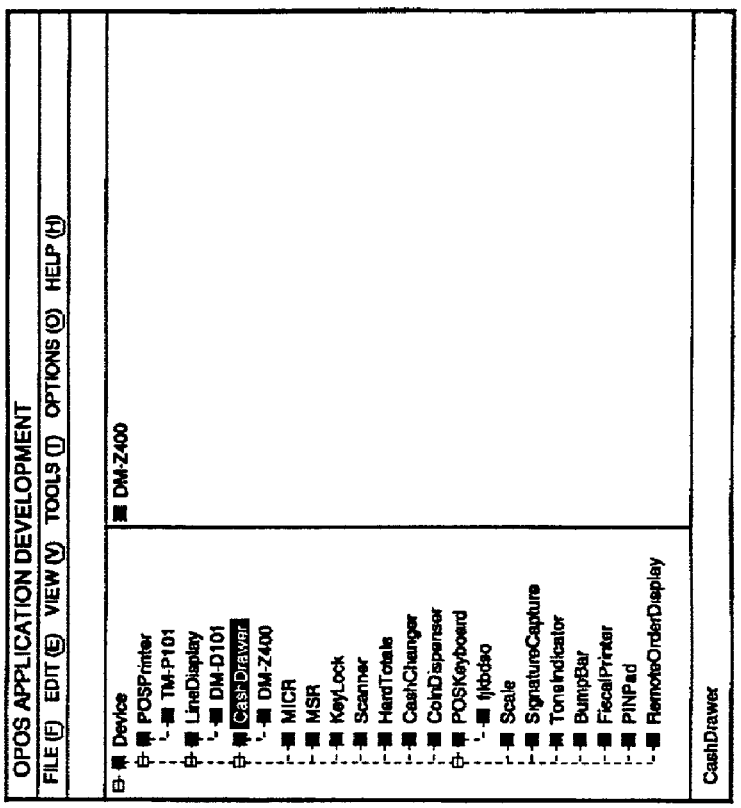
FIG. 12B
FIG. 12C
FIG. 12A

DEVICE ENVIRONMENT CONFIGURATION SYSTEMS, DEVICE ENVIRONMENT CONFIGURATION METHODS, AND DATA STORAGE MEDIA THEREFOR

BACKGROUND OF THE INVENTION

The present invention relates to a device environment configuration systems and methods, and to data storage media for recording the same.

By using a standard application programming interface (API) to develop a software application providing Point-Of-Sale (POS) system functions, multifunction POS systems can be assembled without specifically considering the specific makes and models of devices that are used to configure the POS system. OPOS is an international standard defining a standardized interface for handling devices, such as printers and displays, used in POS terminals (hereinafter POS terminal systems) of a POS system. An OPOS standard object (hereinafter OPOS) uses Object Linking and Embedding (OLE) controls, which are supported by the Windows (a registered trademark of Microsoft Corp.) operating system (OS) running on the host devices of the POS system, to provide application developers with a set of API functions that make application development easier.

Information needed to use OPOS can include information about all of the devices in the POS terminal system and settings for all of the devices (hereinafter OPOS device environment configuration settings). This information is stored in a database (hereinafter the registry) of system configuration information managed by the Windows operating system (hereinafter OS). This registry is a database for centrally managing the settings related to computer operation, including all device driver settings and application settings. Information including a device identifier and various settings stored in the registry as part of the OPOS device environment configuration settings is referred to below as the "device information" or the device profile. In other words, the OPOS device environment configuration settings can include "device information" for each device in the system configuration. The OPOS device environment configuration settings can also include "user information" such as the name of the folder/directory where OPOS is stored or installed.

A typical POS system for a retail store consists of one or more POS terminal systems. To assemble a POS terminal system in a retail store, it is first necessary to develop the POS application. The POS application can be developed by installing OPOS on the host computer (hereinafter developer PC) used for POS terminal system development, inputting the OPOS device environment configuration settings required for OPOS operation, and then developing a software application on the developer PC that provides the various functions of the retail POS terminal system. Thereafter, it is necessary to duplicate the finished application, OPOS, and OPOS device environment configuration settings on the host computer (hereinafter client PC) of each POS terminal system in the retail store.

To replicate the OPOS and OPOS device environment configuration settings that are installed and stored on the developer PC on the client PCs, it has conventionally been necessary to install OPOS and input the OPOS device environment configuration settings on each of the client PCs in much the same way OPOS was installed and the settings were entered on the developer PC. In other words, the tasks which were performed on the developer PC, such as the task of installing OPOS and the task of storing OPOS device environment configuration settings in the client PC registry for the devices in the particular POS terminal system, must be repeated for each retail POS terminal system in the store's POS system. Thus, conventionally, OPOS is installed to all client PCs through the user interface, specific device information is entered using the same user interface, and the OPOS device environment configuration settings are stored to the registry based on the device information input for each individual client PC. Unfortunately, this can be a time-consuming task.

POS terminal system developers have also developed proprietary installation utilities. These proprietary installation utilities can duplicate the software applications developed on the developer PC together with the necessary OPOS and OPOS device environment configuration settings on each of the client PCs in the POS system. However, development of utility software takes time and money.

The OPOS device environment configuration settings used on the developer PC can also be duplicated on each of the client PCs using a registry editor utility provided by the operating system, such as the "regedit.exe" registry editor utility provided by Windows. However, such techniques can only be performed by knowledgeable users. For example, because the registry is a central database of system configuration information that is managed directly by the OS, inappropriately changing registry content could also render the OS, applications, or devices unusable and/or interfere with normal operation. Inadvertently changing data other than the OPOS device environment configuration settings could also cause problems with the system.

SUMMARY OF THE PREFERRED EMBODIMENTS

An aspect of the present invention provides a device environment configuration system that comprises a device environment duplication unit adapted to automatically replicate device environment configuration information to a specific system.

Another aspect of the present invention provides a device environment configuration system comprising a device environment duplication means for automatically replicating device environment information to a specific system.

Another aspect of the present invention provides a device environment configuration method. According to this method, device environment configuration information is automatically replicated to a specific system.

Another aspect of the present invention provides a computer program product that executes a device environment configuration method. The computer program product comprises a data storage medium having computer-readable program code embodied therein. The computer program product comprises computer-readable program code that is configured to automatically replicate device environment configuration information to a specific system.

Another aspect of the present invention provides a data storage medium having computer-executable instructions for performing steps of a device environment configuration method that automatically replicates device environment configuration information to a specific system.

As used above, the device environment configuration information is specific information contained in system configuration information managed by an operating system of a host computer development system used to develop a software application program to be run on the specific system to achieve specific functions.

Another aspect of the present invention provides a device environment configuration program. The device environment configuration program configures an operating environment of a second system based on device environment configuration information recorded to a data storage medium from system configuration information managed by an operating system of a first system host computer. The device environment configuration program includes executable commands that install a device driver object to the second system host computer based on information indicating the storage location of the device driver object contained in the device environment configuration information recorded to the data storage medium, executable commands that paste the device environment configuration information recorded to the data storage medium to or as the device environment configuration information in the system configuration information managed by the second system host computer, and executable commands that update the pasted device environment configuration information to system-specific information based on information specific to the second system contained in the system configuration information managed by the operating system of the second system host computer. The device driver object may comprise a first object and a second object. The first object can provide an interface for a class of devices to an application program, and the second object can provide an interface for a particular device to the first object. The system can be a POS terminal system, the device driver object can be an OPOS object, the first object can be a control object, and the second object can be a service object.

BRIEF DESCRIPTION OF THE DRAWINGS

Aspects and various advantages of the present invention are described below with reference to the various views of the drawings, which form a part of this disclosure.

FIG. 12A shows device information in the OPOS device environment configuration settings grouped by device class for display, FIG. 12B shows device information in the OPOS device environment configuration settings grouped by connection port for display, and FIG. 12C shows a tree map of a hydra connection.

DESCRIPTION OF THE PREFERRED EMBODIMENTS

Figure 1:
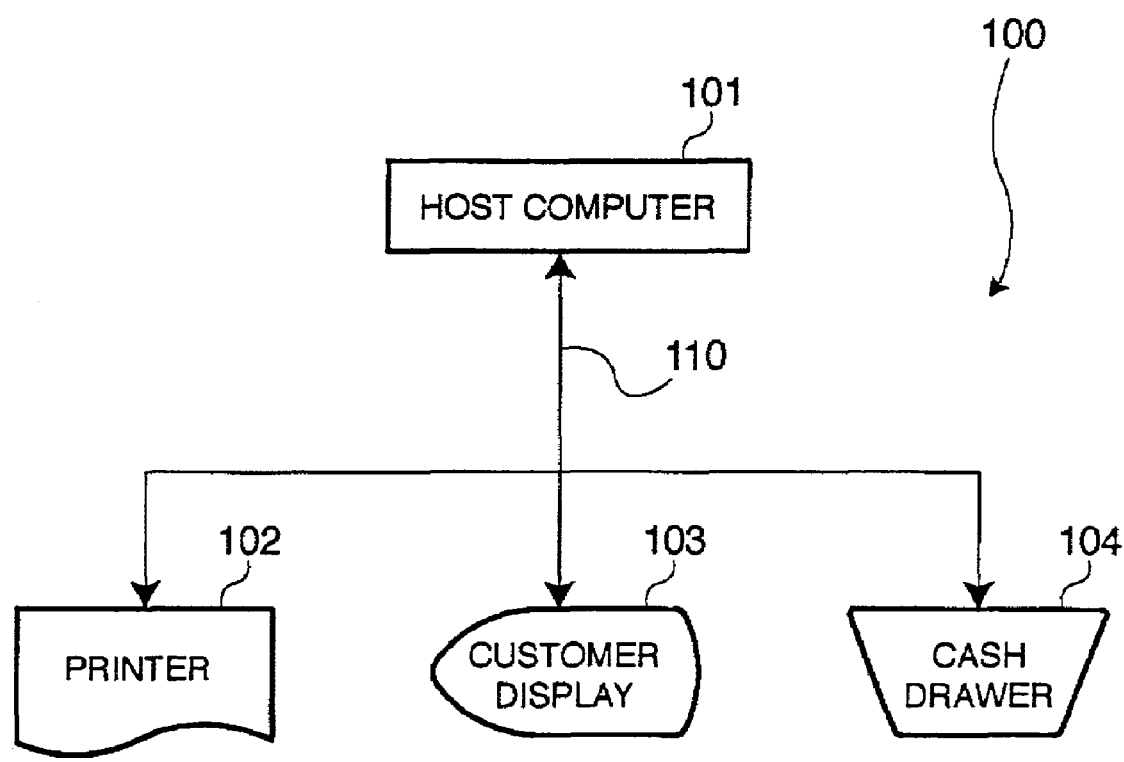
FIG. 1 shows a typical POS terminal system configuration.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected to" another element, it can be directly connected to the other element or intervening elements may also be present. In contrast, when an element is referred to as being "directly connected to" another element, there are no intervening elements present. When an element is referred to as being "between" two things, it can be either partly of completely between those two things, but is not necessarily completely and continuously between those two things. The term "adapted to" should be construed to mean "capable of". As used herein the acronym "DEC" stands for "device environment configuration".

The inventors observed that the OPOS and OPOS DEC settings that are needed to run an application developed on a developer PC can be replicated on the one or more client PCs of a POS system without using a user interface of client PCs. In particular, this can be accomplished by generating settings information from the OPOS DEC settings of the developer PC so that the same information can be duplicated in the OPOS DEC settings of the client PC, and then searching and generating settings specific to each client PC based on the system configuration information of the particular POS terminal system.

Aspects of the present invention can provide DEC systems, methods, and data storage media for recording the DEC methods, that are adapted to automatically duplicate, on a particular system, the DEC settings of the development system used to develop the application that achieves the functions of the particular system.

Aspects of the present invention can provide DEC systems, DEC methods, and data storage media recording the DEC methods, that are adapted to automatically replicate, on a particular system, the DEC settings of a development system used to develop a software application program that is run to achieve specific functions on the particular system.

A preferred implementation of a DEC system according to aspects of the present invention has a device environment duplication means adapted to automatically replicate DEC information to a specific system. This DEC information is specific information contained in system configuration information managed by the operating system of a host computer development system that is adapted to be used for developing a software application program to be run on the specific system to achieve specific functions.

The device environment duplication means can include, for example, (a) same settings generating means for generating settings identical to the device environment settings of the host computer development system based on the device environment settings of the development system recorded to the data storage medium, (b) system-specific settings generating means for generating system-specific settings that differ according to the specific system based on system configuration information managed by the host computer of the specific system, and (c) settings storage means for storing the same settings generated by the same settings generating means and the system-specific settings generated by the system-specific settings generating means in the system configuration information of the specific system as device environment settings for the specific system.

In another preferred implementation, the same settings generating means can have at least one of the following: (a1) means for using DEC information of the development system recorded to the data storage medium as the same settings information without editing, and (a2) means for obtaining the same settings information from the DEC information of the development system recorded to the data storage medium, except for information that changes based on the hardware specifications of the host computer of the specific system.

In another preferred implementation, the system-specific settings generating means can have an interface identification number detecting means for detecting the interface whereby a specific device in the specific system configuration is connected to said specific system and detecting the identification number of the detected interface. USB is one example of the detected interface.

In another preferred implementation, the DEC system can also have a DEC information storage means for recording and storing DEC information in the development system configuration information managed by the operating system of the development system host computer to a data storage medium.

In another preferred implementation, the DEC information storage means has a data selection means adapted to specify one or a plurality of settings in the DEC information to be recorded to the data storage medium; a device information detection means adapted to find the settings selected by the data selection means from the DEC information; and a device information recording means adapted to record the settings found by the device information detection means to the specific data storage medium.

In another preferred implementation, the settings specified by the data selection means can be all information in the DEC information, device information for one or a plurality of devices in the device environment, and/or device information for a desired device in the device environment and device information for all devices connected to the desired device by a specific connection method.

In another preferred implementation, aspects of DEC techniques described above can also be implemented as a computer-executable program. In this case, the program can be distributed recorded to a data storage medium such as a Compact Disc, floppy disk, hard disk, magneto-optical disk, Digital Video/Versatile Disc, magnetic tape, semiconductor memory, or other computer readable medium.

Aspects of the present invention will now be discussed below with reference to the accompanying figures. As noted above, the following embodiments are shown by way of description only and shall not limit the scope of the present invention. One of ordinary skill in the art will appreciate that various alternative embodiments can be achieved by replacing some or all of the elements described below with equivalent elements, and that all such variations are included in the scope of this invention.

FIG. 1 shows the configuration of a typical POS terminal system 100. This POS terminal system 100 can include, for example, a host computer 101, printer 102, customer display 103, and cash drawer 104. The host computer 101 can store a software application providing the various functions of the POS terminal system 100. The host computer 101 can be connected by a communication bus 110 to a printer 102 that prints, for example, receipts and a transaction journal, the customer display 103 can display purchase information, and the cash drawer 104 can hold money and checks. Various communication protocols can be used on the communication bus 110. For example, serial, parallel, and network (such as IEEE (Institute of Electrical and Electronic Engineers) 802) communication protocols can be used, as well as Universal Serial Bus (USB).

Figure 2:
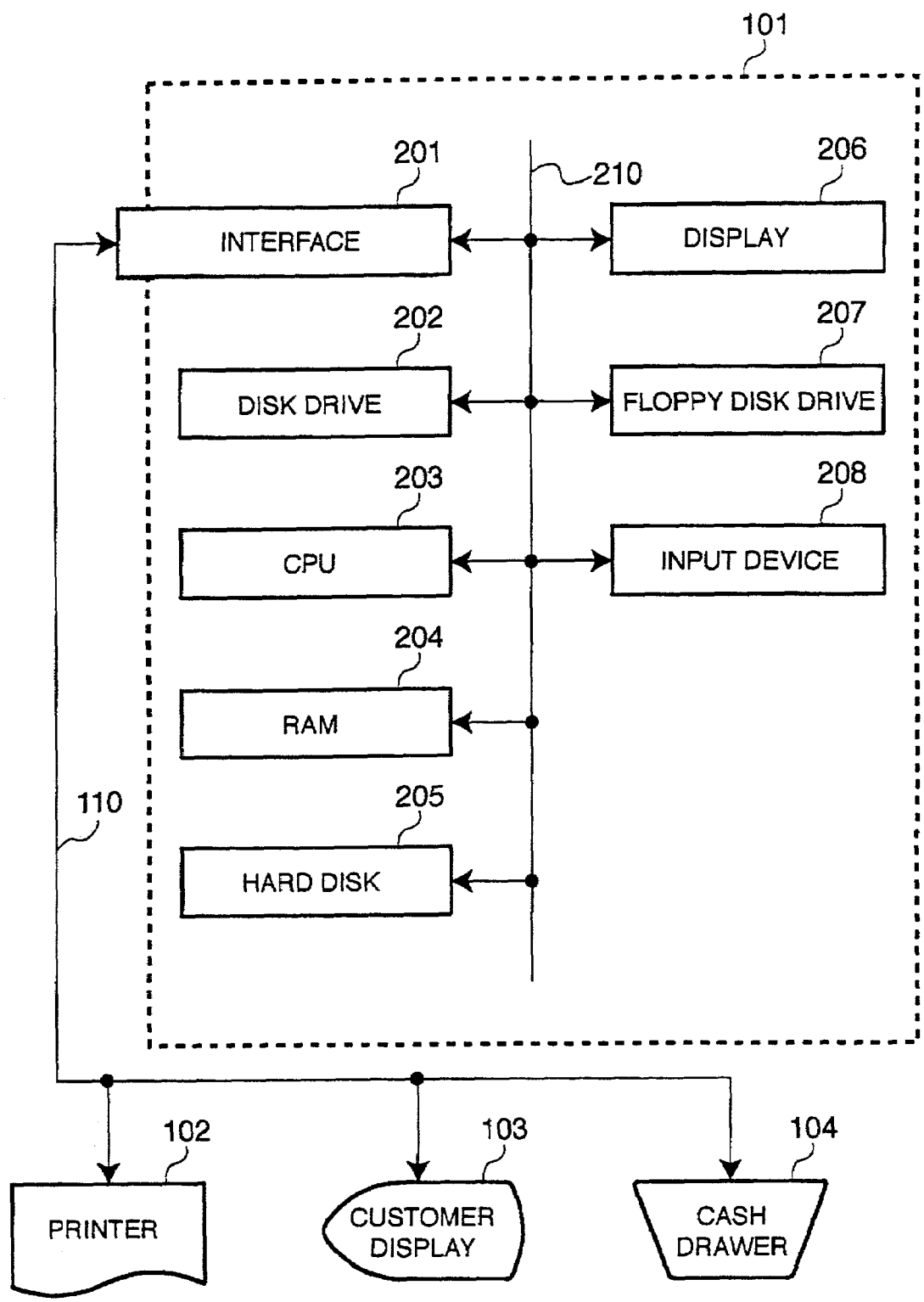
FIG. 2 is a block diagram of a POS terminal system.

FIG. 2 is a block diagram of the host computer 101. The host computer 101 has an interface 201 adapted to connect to the communication bus 110, a disk drive 202 that can read software and information from a CD (Compact Disc), DVD (Digital Video/Versatile Disc) or other medium, a central processing unit (CPU) 203, RAM 204 adapted to store the program run by the CPU 203 and used as working memory by the CPU 203, a hard disk 205 adapted to store the program and data used by the CPU 203, a monitor or other type of display device 206 adapted to present messages and information for the user, a floppy disk drive 207 adapted to read software and other information from a floppy disk, a keyboard and mouse or other type of input device 208 enabling user input to the system, and a bus 210 that connects these various components.

Figures 3A, 3B:
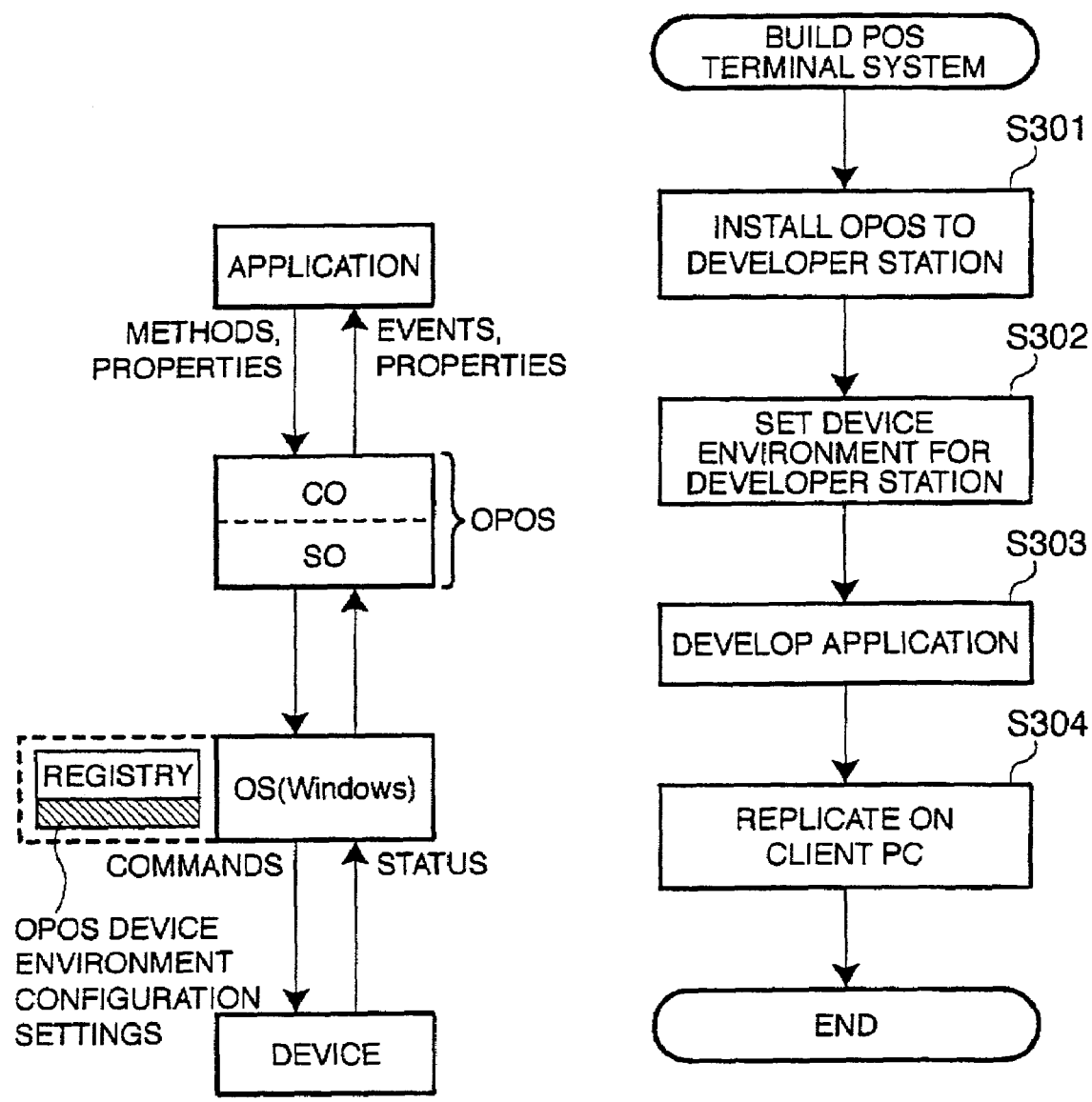
FIG. 3A shows the relative position of OPOS in a POS terminal system.
FIG. 3B is a flow chart of POS terminal system development.

FIGS. 3A and 3B illustrate the role of OPOS in a POS terminal system. FIG. 3A shows where OPOS is positioned, and FIG. 3B is a flow chart of system development for a POS terminal system. As shown in FIG. 3A, OPOS is located between the operating system (OS) and an application that controls the devices in the POS terminal system. OPOS provides a standardized interface that connects the host computer (PC) and peripheral devices based on defined specifications.

OPOS has two layers known as the control object (CO) layer and the service object (SO) layer. Control objects are provided for each device class, such as printers and displays, and control the device-application interface. Service objects are provided for each device, such as for each printer model. The service objects control device operation by way of the OS. The OS also manages the registry, which is where the OPOS DEC settings used by OPOS are stored.

The application controls a particular device using methods and properties, and receives feedback about the result of device control from the controlled device using events and properties. OPOS converts process requests from the application to commands supported by the device. OPOS sends the commands to the addressed device, and receives the device status indicating the process result from the device.

As shown in FIG. 3B building a POS terminal system involves four major tasks. First is installing OPOS to the host computer used for development (step S301). This host computer is referred to herein as the "developer PC." More specifically, control objects and service objects are installed in a desired directory, and the OPOS DEC settings can be added to the registry. The OPOS DEC settings of the developer PC can then be edited to match the devices used in the POS terminal system, and saved in the registry of the developer PC (step S302). A software application that provides the desired functions of the POS terminal system can then be developed on the developer PC (step S303). Next, the application environment, which includes OPOS and the OPOS DEC setting, can be replicated. The application can also be developed on the developer station on the client PCs of the plural POS terminal systems of the POS system (step S304), thus completing POS terminal system configuration.

A DEC system that improves the efficiency of the task performed at step S304 (in the above-described POS terminal system setup procedure) is needed. The task of replicating the application developed on the developer PC to the client PC and the application environment used for application development, will now be described.

Figure 4:
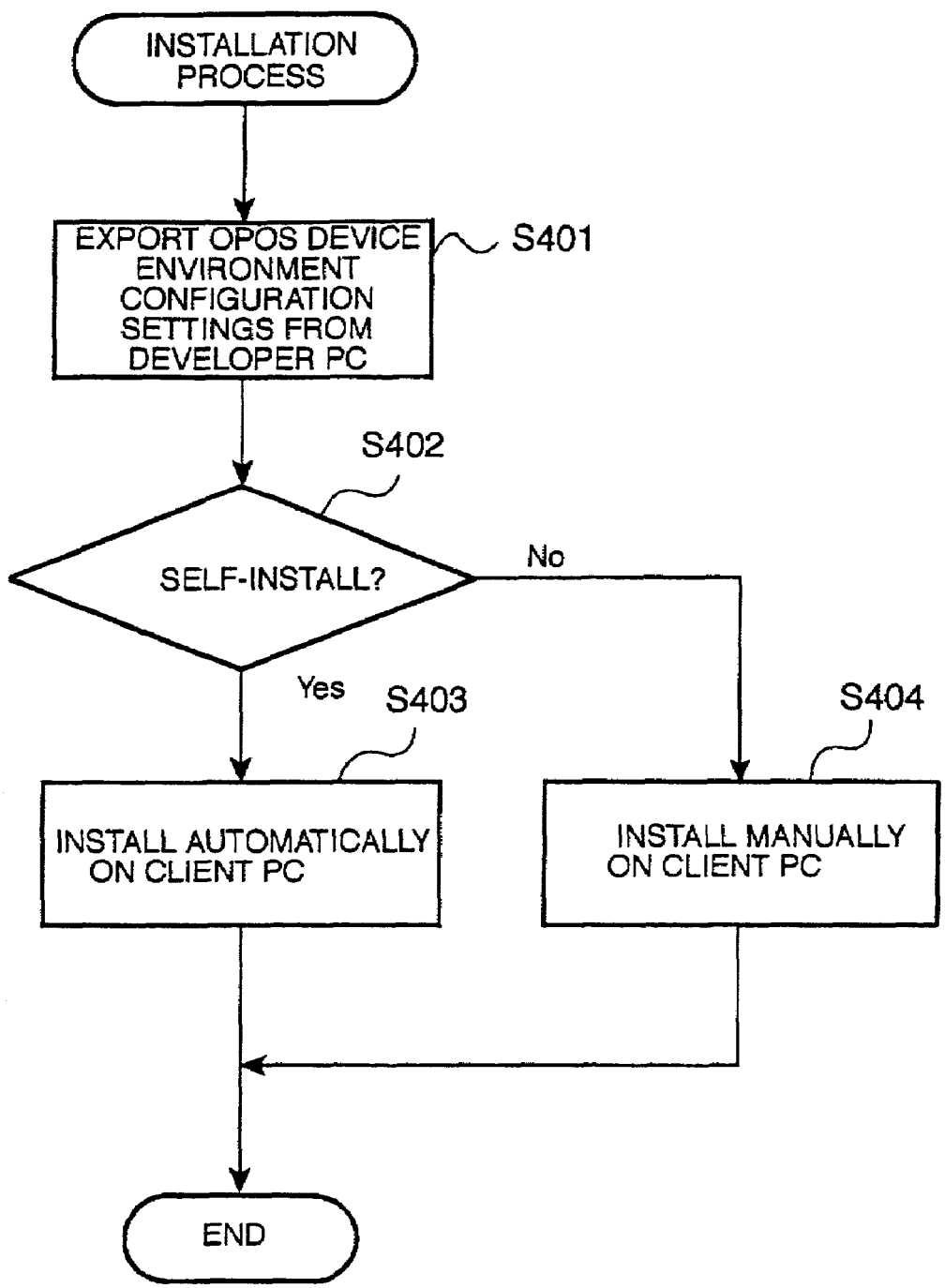
FIG. 4 is a flow chart of an OPOS device environment configuration settings installation process.

FIG. 4 is an example of a flow chart that illustrates an OPOS DEC settings installation procedure. As shown in FIG. 4, this procedure for installing the OPOS DEC settings starts on the developer PC with storing the OPOS DEC settings in the registry of the developer PC to a floppy disk or other storage medium (S401).

The next step (S402) is deciding whether the developer PC OPOS DEC settings stored to the data storage medium are to be automatically duplicated on the client PC, that is, whether the settings are to be self-installed.

If the settings are to be self-installed (S402 returns yes), then the OPOS DEC settings of the developer PC written to the data storage medium can be written to the OPOS DEC settings in the registry of the client PC, without using the user interface. Settings specific to the client PC to which the OPOS configuration settings are self-installed can also be set automatically without using the user interface (S403).

If the configuration settings are not self-installed (S402 returns no), then the same operation used to set the OPOS DEC settings on the developer PC is repeated to thereby install the same configuration settings on the client PC. Alternatively, the configuration settings can be installed to the client PC using an installation utility developed by the developer that assembled the POS terminal system (S404).

A DEC system that can improve the efficiency of step S401 and step S403 will now be described below. As described above, step S401 is a function of the developer PC whereby the OPOS DEC settings stored in the registry of the developer PC can be saved to a floppy disk or other data storage medium. Step S403 is a function of the client PC whereby the OPOS DEC settings of the developer PC can be automatically duplicated from the floppy disk or other data storage medium to the client PC.

Figure 5A:
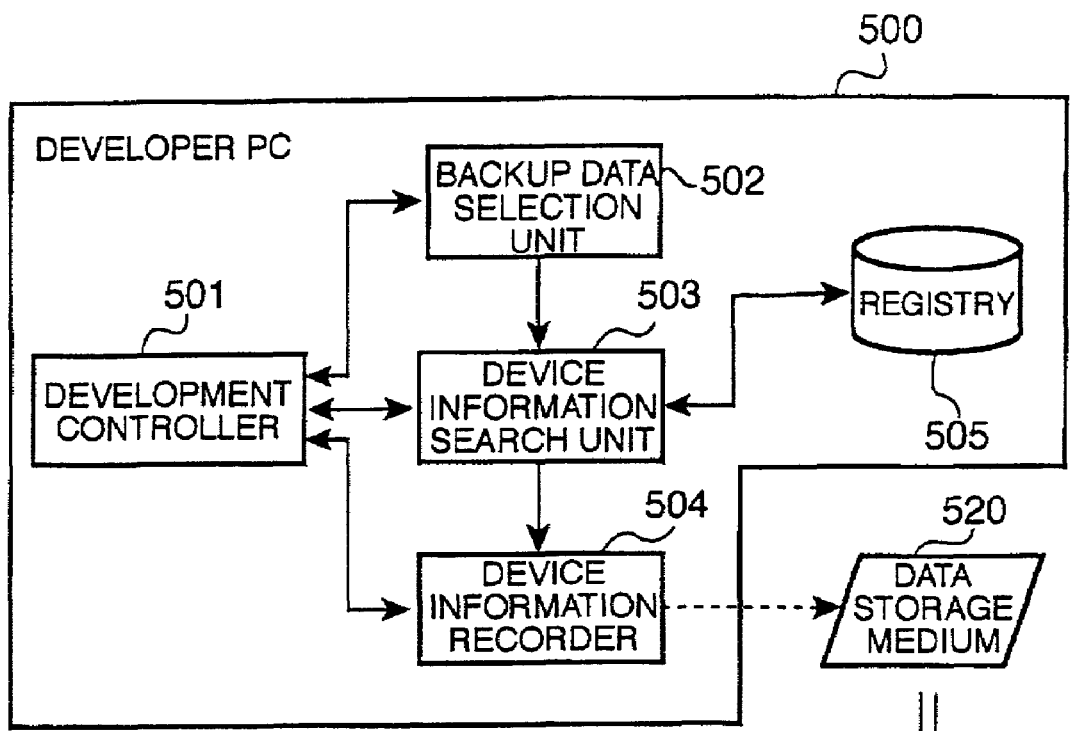
FIG. 5A is a block diagram of a developer PC registry export function.
Figure 5B:
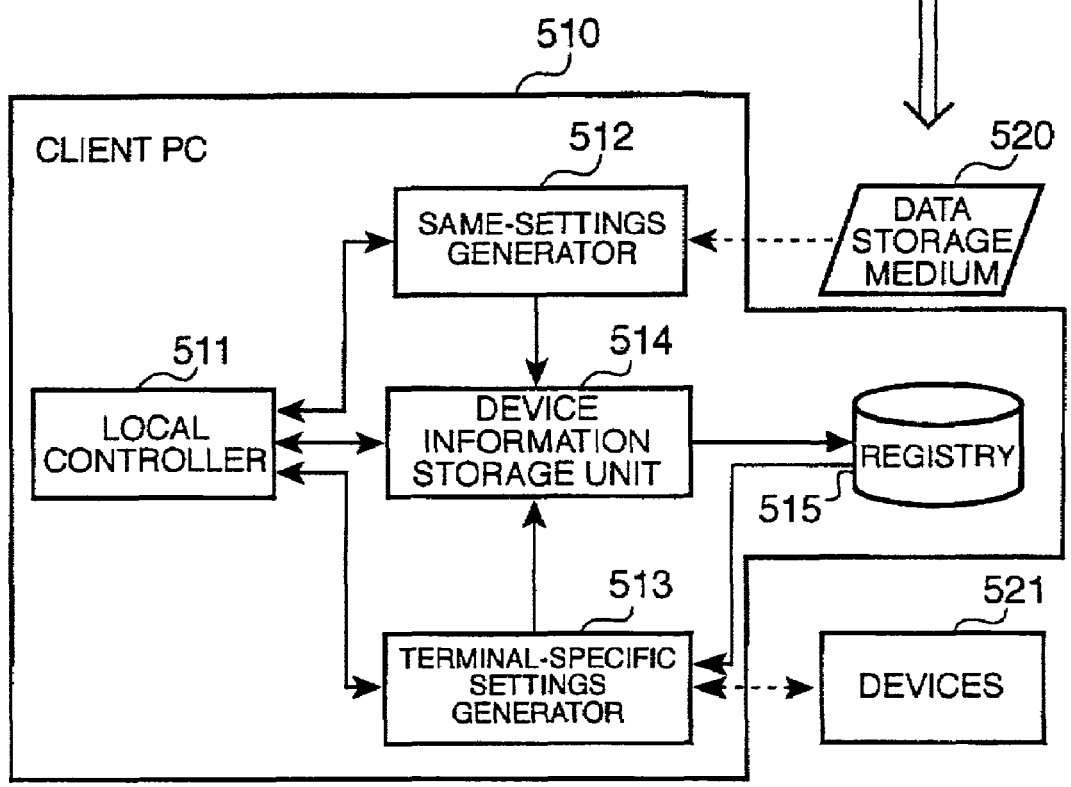
FIG. 5B is a block diagram of a self-install function of a client PC.

FIG. 5 is an example of a functional block diagram for a DEC system. The various functions are described below. FIG. 6A shows an example of a block diagram of the developer PC registry export function. FIG. 5B shows an example of a block diagram of the self-install function of a client PC. As shown in FIG. 5A, the function for saving the registry (referred to below as the "registry backup function") of the developer PC 500 can implement a development controller 501, a backup data selection unit 502, a device information search unit 503, and a device information recorder 504.

The backup data selection unit 502 can be used to specify what OPOS DEC settings stored in the registry 505 of the developer PC 500 are to be saved (backed up). A keyboard, mouse, or other input device (not shown in the figure) is typically used for this operation.

Based on the settings selected for backup by the backup data selection unit 502, the device information search unit 503 can find the selected settings in the OPOS DEC settings written to registry 505.

The device information recorder 504 can then compile the registry backup data to save to data storage medium 520 from the settings found by the device information search unit 503, and can write the compiled registry backup data to the data storage medium 520. The backup data can be compiled according to the type of data storage medium 520 used. For example, if floppy disks are used for the data storage medium 520, the data can be segmented and stored across plural media. It could also be compressed for storage.

The development controller 501, backup data selection unit 502, device information search unit 503, and device information recorder 504 can be cooperatively controlled.

As shown in FIG. 5B, the self-install function of the client PC 510 can implement a local controller 511, same-settings generator 512, terminal-specific settings generator 513, and a device information storage unit 514.

The same-settings generator 512 can capture the OPOS DEC settings of the developer PC 500 saved to data storage medium 520 by the registry backup function, and can generate the same information to be stored as the OPOS DEC settings in the registry 515 of the client PC 510. The OPOS DEC settings of the developer PC 500 can be saved/segmented to plural media or compressed. For example, the same-settings generator 512 can be configured to capture the same settings information according to the format in which the settings were saved.

The terminal-specific settings generator 513 can capture the terminal-specific information to be stored in the registry 515 of the client PC 510, and can generate the device-specific information to be stored to the OPOS DEC settings of the registry 515, based on the devices 521 connected to the client PC 510 or the hardware specifications of the client PC 510.

The device information storage unit 514 can then store the same settings information generated by the same-settings generator 512, and the terminal-specific information generated by the terminal-specific settings generator 513, to the OPOS DEC settings of the registry 515.

The same-settings generator 512 can delete settings that could change according to the hardware specifications of the client PC 510 from OPOS DEC settings of the developer PC 500 when generating the same-settings information. The device information storage unit 514 could add the terminal-specific settings generated by the terminal-specific settings generator 513 to the same-settings information. The resulting combined data could then be stored as the OPOS DEC settings in the registry 515 of that terminal.

Alternatively, the same-settings generator 512 can capture the same settings information without editing the OPOS DEC settings of the developer PC 500 so that the device information storage unit 514 overwrites or appends the terminal-specific data generated by the terminal-specific settings generator 513, according to hardware specifications of the client PC 510 to the same settings information, and appends to the same settings information the terminal-specific settings generated by the terminal-specific settings generator 513 according to the devices 521 connected to the client PC 510.

Moreover, the same-settings generator 512 can also search the registry 515 to determine if OPOS DEC settings are already stored in the registry 515. If they are, the same-settings generator 512 can compare the existing OPOS DEC settings of the client PC 510 with the OPOS DEC settings from the developer PC 500 that are saved to the data storage medium to capture, as the same settings information, only those configuration settings to be changed (overwritten) or appended to the existing settings.

The local controller 511, same-settings generator 512, terminal-specific settings generator 513, and device information storage unit 514 can also be cooperatively controlled.

Figure 6:
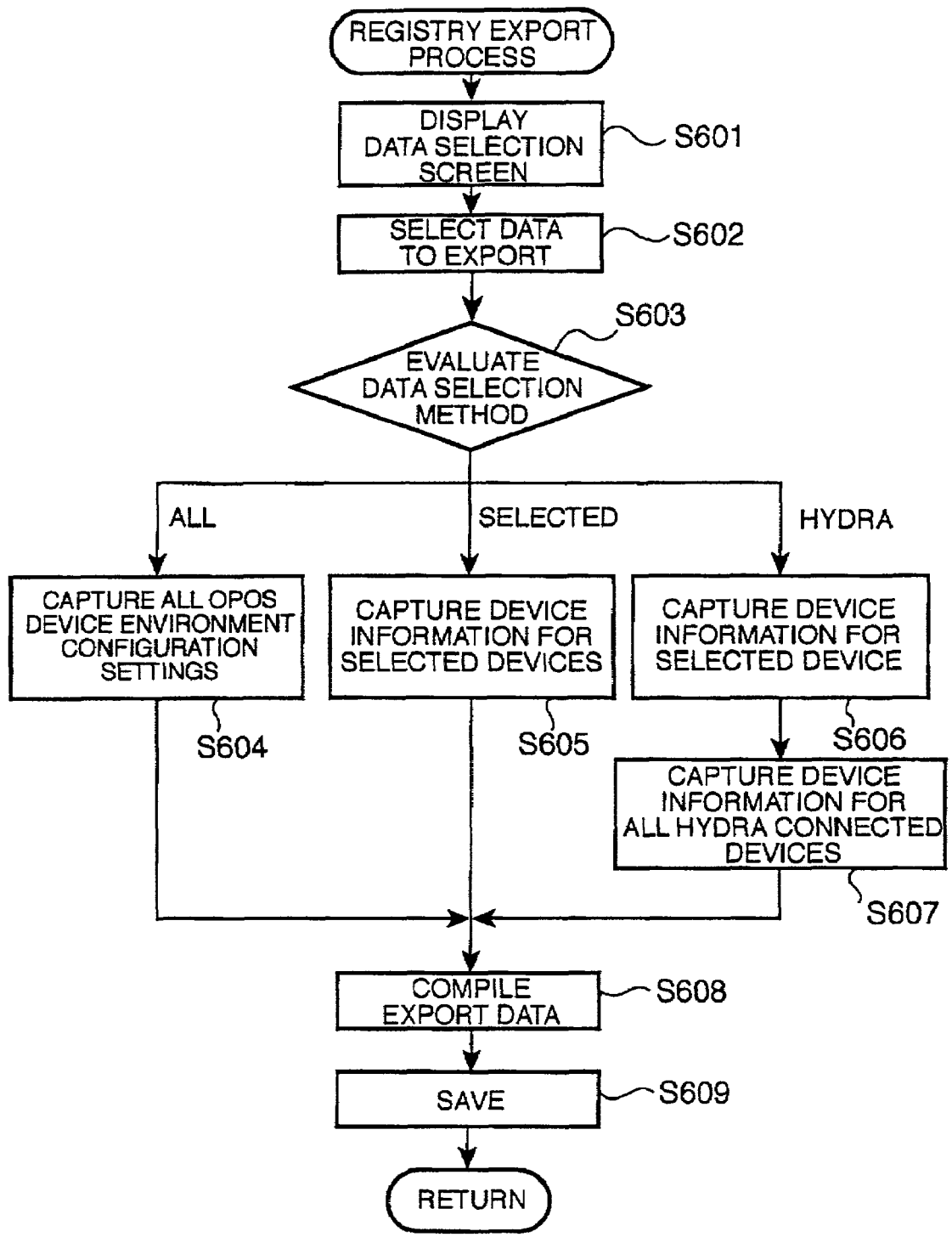
FIG. 6 is a flow chart of the registry export process of a device environment configuration process.
Figure 10:
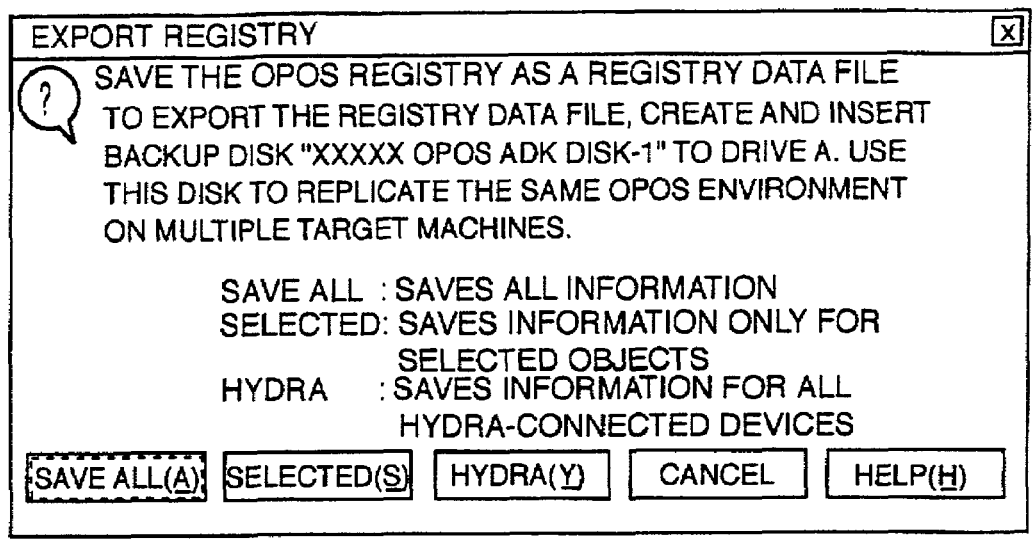
FIG. 10 shows an example of a registry export screen.

FIG. 6 is a flow chart of an example of a registry backup process that can be run on the developer PC in the above DEC process. The first step is to display a screen (window) for saving the OPOS DEC settings from the registry (S601). Next, the user selects those displayed OPOS DEC settings to be saved from the registry (S602). The type of information (setting) selected is then detected (S603). An example of a registry backup screen is shown in FIG. 10.

If the selected information is "all OPOS DEC settings" (S603 returns ALL), all OPOS DEC settings are obtained (S604), and the procedure advances to step S608. Step S604 is executed when the user selects SAVE ALL in the screen shown in FIG. 10.

If the selected information is "device information selected from the OPOS DEC settings for a specific device" (S603 returns SELECTED), the device information for the preselected device is found in the OPOS DEC settings (S605), and the procedure advances to step S608. Step S605 is executed when the user selects SELECTED in the screen shown in FIG. 10.

If the selected information is "OPOS DEC settings for selected devices and related hydra-connected devices" (S603 returns HYDRA), the device information for the preselected device is found in and obtained from the OPOS DEC settings (S606) if the selected device is hydra connected. Based on the device information for the selected device, device information for all devices hydra connected to the selected device is similarly captured (S607), and the procedure advances to step S608.

A hydra connection is a method of connecting plural devices to a single port on the terminal. Hydra connections can be pass-through or Y-connections (see FIG. 12). Steps S606 and S607 can be run when the user selects HYDRA in the screen shown in FIG. 10.

The backup settings can then be compiled from the captured OPOS DEC settings (S608), and the compiled backup settings can then be written to the data storage medium (S609) to complete the registry backup process.

The assignee of the present application has also developed a software utility application (described in Japanese Patent Application JP 2001-1858 and in commonly assigned, co-pending U.S. application Ser. No. (not assigned), entitled "Device environment configuration system, device environment configuration method, and data storage medium therefor") which, by displaying a device tree organized by device class or connection port based on the OPOS DEC settings stored in the registry, enables the POS system developer to visually understand how the devices in a POS terminal system are connected so that the device information can be easily edited and stored to the registry. The registry backup process described herein is an example of a function provided by the software utility application.

FIG. 12A shows an example of a device map organized by device class that illustrates how the various peripheral devices can be connected. FIG. 12B shows a display organized by device connection port. When the user selects Export Registry from the tools menu of FIG. 12A or FIG. 12B, a window such as shown in FIG. 10 is presented and the registry backup process can begin. Devices selected for steps S605 and S606 in FIG. 6 can be selected using a mouse or other input device in the window shown in FIG. 12A or 12B.

OPOS DEC settings saved by the registry backup function of the registry editor provided by the OS can, of course, be used in the self-installation process. The registry editor can save all information in the registry 505 of the developer PC 500, including the OPOS DEC settings, to a data storage medium. In this case, the same-settings generator 512 can search all of the registry 505 data stored to the data storage medium to find the OPOS DEC settings, and then set the same settings information.

FIG. 12C illustrates the physical connections of the pass-through and Y connections. With a pass-through connection, data flows from the host computer (PC) to the customer display (line display) where it can be stored to the receive buffer and only printer data (POS printer) is passed on to the printer. With the Y connection shown in FIG. 12C, data from the host can be simultaneously sent to the customer display and printer.

Figure 7:
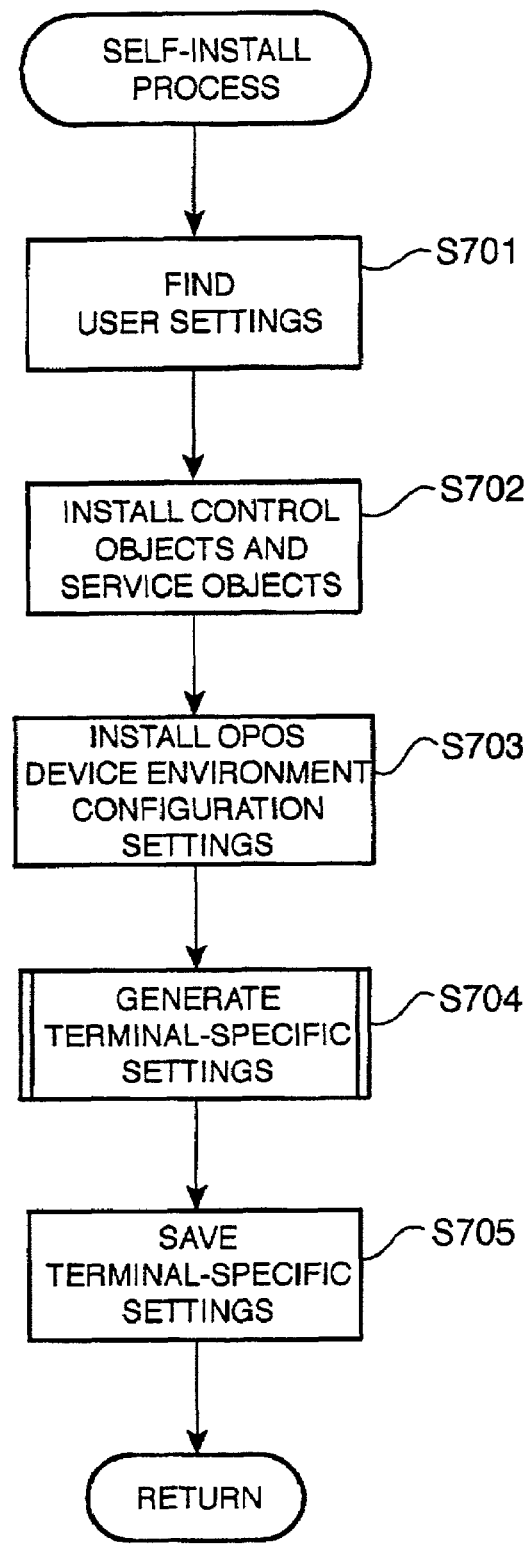
FIG. 7 is a flow chart of the self-installation process of a device environment configuration process.

FIG. 7 is a flow chart showing an example of the self-installation process that can be run on the client PC during the DEC process. The first step in this process can be to find the user settings contained in the OPOS DEC settings saved from the developer PC registry to the data storage medium (S701). The user settings contain information such as the user name and destination folder where the OPOS are to be installed.

The control objects and service objects saved to the data storage medium can then be installed to the client PC based on the user settings found in the OPOS DEC settings (S702). The OPOS DEC settings of the developer PC are then added to the client PC registry (S703). The data storage medium to which the control objects and service objects are stored can be the same data storage medium to which the OPOS DEC settings are stored, or a different medium.

Terminal-specific data stored in the client PC registry can then be obtained based on the devices connected to the client PC or the hardware specifications of the client PC 510, and terminal-specific data for overwriting to the OPOS DEC settings can be generated (S704).

The resulting terminal-specific settings can then be saved to the OPOS DEC settings in the client PC registry (S705), and the self-installation process ends.

Figure 8:
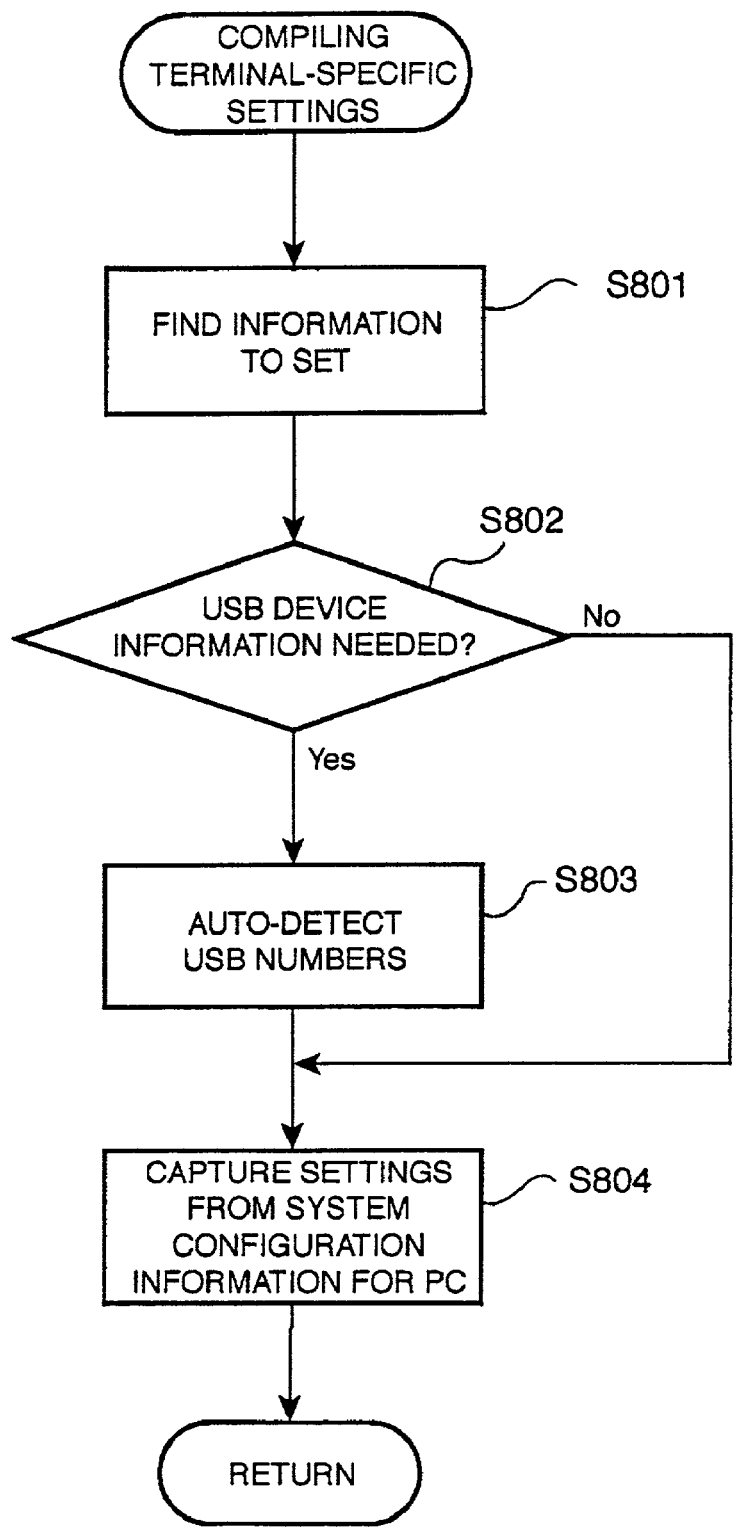
FIG. 8 is a flow chart of terminal-specific settings generation routine in the self-installation process.

FIG. 8 is a flow chart showing an example of a subroutine that can generate the terminal-specific settings in the self-installation process described above. The information to be set for the particular client PC is generally first found in the OPOS DEC settings (S801). At step S802, it can then be determined whether device information for a USB device is needed (that is, whether the device is connected to a USB port) (S802). If USB device information is needed (S802 returns yes), then the USB device number is automatically located (S803), and the procedure can advance to step S804. The information to be set can then be defined according to the hardware specifications of the client PC (S804), and the subroutine for generating the terminal-specific settings ends. Note that client PC hardware specifications include the maximum number of each port type (serial port, parallel port, other).

Accordingly, control objects and service objects can be copied to the client PC based on user settings information contained in the OPOS DEC settings of the developer PC saved to a data storage medium. OPOS DEC settings from the developer PC can be written to the registry of the client PC, and PC-specific information in the OPOS DEC settings can then be overwritten according to the client PC configuration. Furthermore, this process can be completed automatically without using the user interface.

Figure 9A:
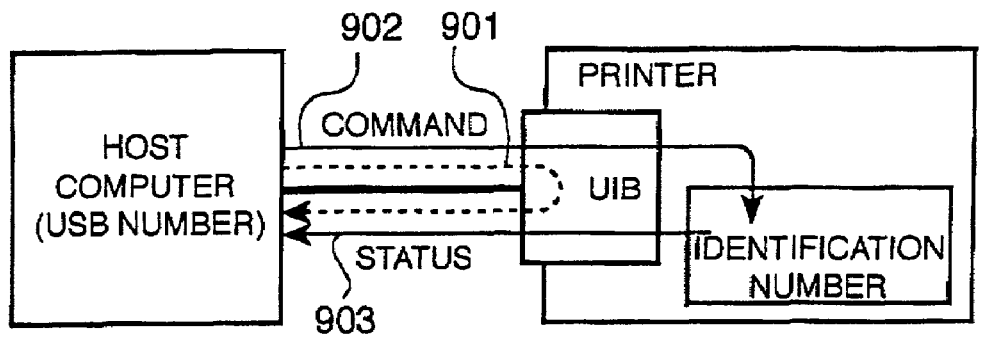
FIG. 9A shows how data is communicated between a host computer and printer in the USB number detection process.
Figure 9B:
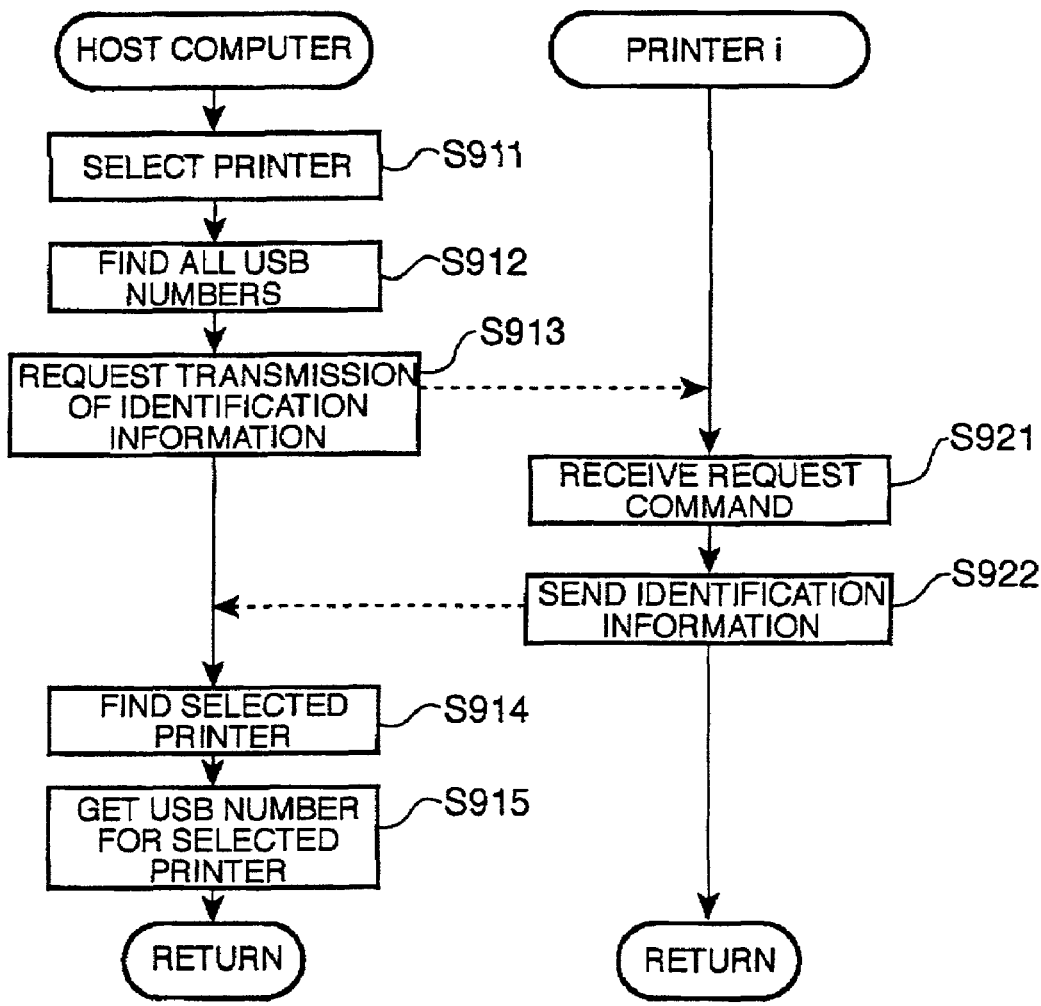
FIG. 9B is a flow chart of communication between a host computer and printer.

A routine that can automatically find the USB device numbers will be described next with reference to FIG. 9 and FIG. 11. FIGS. 9A and 9B show an example of the automatic detection process for finding USB device numbers for the USB port where the printer is connected. FIG. 9A shows how data is communicated between the host computer (simply "host" below) and printer during the USB number detection process, and FIG. 9B is an example of a flow chart of this host-printer communications process.

Typically, a USB device number is automatically assigned when a USB device is connected to the host. As shown in FIG. 9A, the USB number is typically linked to the unique identification number of the USB interface board (UIB) installed in the device (printer), but is not linked to the unique identification number of the printer. The USB number can therefore be used to identify which UIB is used, but cannot be used to determine to which printer the UIB is installed. In other words, when a printer is connected to the host, the host can relate the unique identification number of the UIB to the USB number, based on the communication path 901 indicated by the dotted line. Conversely, the host cannot relate the USB number to the unique identification number of the printer.

The unique printer identification number can, however, be obtained by sending a request command to the printer. The host can therefore send a transmission request to the printer, as indicated by transmission path 902, asking the printer to return the unique printer identification information. The host can then receive the printer identification information as a status report from the printer via reception path 903. The host is thus able to obtain identification information for a specific printer and then link this printer identification information to the USB number obtained from the UIB.

These methods can make it possible to provide a system for automatically detecting the USB number used by a particular printer (and the USB numbers used by any line display, cash drawer, MICR (magnetic ink character reader)), or other device hydra connected to the printer) selected (used) by the user. These methods can also be applied with communication protocols other than USB.

Communication between the host and printer will now be described with reference to FIG. 9B. As shown in FIG. 11 (further described below), the host can first prompt the user to select the printer for which the USB number is to be detected (S911). Let us assume that printer A is selected. All USB numbers associated with the USB port to which the printer is connected can then be detected (S912). The host can then send a request command to each printer i connected to the USB port of every USB number that is found, thus requesting each printer i to send printer identification information back to the host (S913). Note that argument i is any integer from 1 to n where n is the number of USB-connected printers.

When printer i receives the identification information request command from the host (S921), it can return a status report containing the printer identification information to the host (S922), and the process ends. The printer identification information in this example is the product ID identifying the particular printer and the languages supported by the printer. Based on the product ID and supported languages information received from printer i, the host can find the selected printer A (S914), can detect the USB number for the UIB connected to printer i, which is now known to be printer A (S915), and the automatic USB number detection process ends. It should be noted that while the product ID and supported languages are described as the information identifying a specific printer i, any information that identifies a specific printer model or type and is unique to that model can be used.

Figure 11:
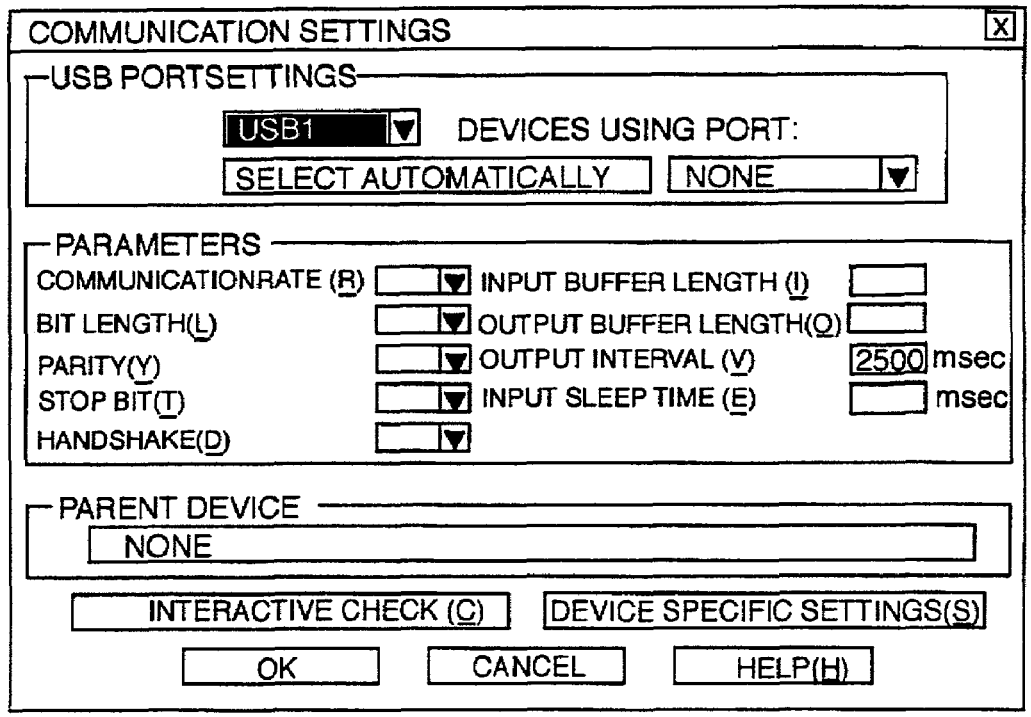
FIG. 11 shows a user interface of a USB number detection process.

FIG. 11 shows an example of a typical user interface for automatically detecting USB numbers. When "set automatically" is selected in the communication setup screen as shown in FIG. 11, the USB number can be detected for a preselected device. This communication setup screen can be presented as part of the OPOS and OPOS DEC settings installation procedure using a conventional user interface. If the printer for which the USB number is to be detected has already been selected from a screen such as that presented in FIG. 12A or FIG. 12B, the communication setup screen such as that shown in FIG. 11 can be presented when the user selects the appropriate item for setting up the communication parameters from the edit menu of the main menu bar, or from the right-click menu that is displayed by right-clicking when an item is selected.

Notably, this USB number search can be conducted automatically without using the user interface when the automatic installation function (self-install function) is used. More specifically, the automatic USB number detection process shown in FIG. 9 can be conducted without going through the user interface because the client PC 510 can identify the printer i for which the USB number is to be detected based on the OPOS DEC settings stored to the registry 515 of the client PC at block S703 of FIG. 7.

If the programmable functions of this DEC system can be assigned to corresponding steps in the flow charts in FIG. 4, FIG. 6, FIG. 7, and FIG. 8, the device environment duplication step can be step S403, and the step for exporting the DEC information can be step S401.

The same information can be generated using steps S701 to S703, the terminal-specific settings can be generated at step S704, the settings data can be saved and/or exported at steps S703 and S705, and the interface identification number can be detected at step S803.

Furthermore, the settings data to export can be selected at step S602, the device information can be performed at steps S604, S605, S606, and S607, and the device information can be recorded at steps S608 and S609.

Thus DEC methods that can have wide practical utility can be provided by incorporating the programmable functions of the above-described DEC system in a computer.

Aspects of the present invention can duplicate the OPOS DEC settings that run the application, which is developed on a developer PC, onto one or a plurality of client PCs that configure a POS system, without using the user interface. This can be accomplished by generation of configuration information to enable the same information set in the OPOS DEC settings of the developer PC to be set in the OPOS DEC settings of the client PCs, and then finding and generating terminal-specific settings for each client PC based on the specific configuration of the POS terminal system.

Aspects of the present invention can thus eliminate data input errors during the duplication process. The information to be duplicated can be accurately and easily duplicated by running the duplication process without going through the user interface. Furthermore, the input time of the duplication process can be reduced by not using the user interface. As a result, the time required to complete the duplication process for all client PCs in a POS system, and the cost associated with the duplication process, can be reduced. The duplication process can also be run by operators having no specific knowledge of the process.

While the present invention has been described in terms of certain preferred embodiments, those of ordinary skill in the will appreciate that certain variations, extensions and modifications may be made without varying from the basic teachings of the present invention. As such, the present invention is not limited to the specific preferred embodiments described herein. Rather, the scope of the present invention is to be determined from the claims, which follow.

What is claimed is:

1. A device environment configuration system, comprising:
   a device environment configuration information storage means for recording and storing device environment configuration information in development system configuration information managed by an operating system of a development system host computer to a data storage medium, the device environment configuration information storage means includes:
      a data selection means for selectively specifying one or a plurality of settings in the device environment configuration information to be recorded to the data storage medium;
      a device information detection means for finding the settings selected by the data selection means from the device environment configuration information; and
      a device information recording means for recording the settings found by the device information detection means to the specific data storage medium;
   a device environment duplication means for automatically replicating device environment configuration information to a specific system,
   wherein the device environment configuration information is specific information contained in system configuration information managed by an operating system of a host computer development system used to develop a software application program to be run on the specific system to achieve specific functions.

2. The device environment configuration system of claim 1, wherein the device environment duplication means comprises:
   a same settings generating means for generating settings identical to the device environment settings of the host computer development system based on the device environment settings of the development system recorded to a data storage medium;
   a system-specific settings generating means for generating system-specific settings that differ according to the specific system based on system configuration information managed by the host computer of the specific system, the system-specific settings generating means generates device-specific information based on one or more devices connected to the device environment duplication means or hardware specifications of the device environment duplication means; and
   a settings storage means for storing the same settings generated by the same settings generating means and the system-specific settings generated by the system-specific settings generating means in the system configuration information of the specific system as device environment settings for the specific system,
   wherein the same-settings generating means deletes settings that change according to the hardware specifications of the device environment duplication means from the device environment configuration information settings of the device environment configuration information storage means when generating the same-settings information,
   wherein the settings storage means adds the system-specific settings generated by the system-specific settings generating means to the same-settings information, and resulting combined data is stored as the device environment settings for the specific system.

3. The device environment configuration system of claim 2, wherein the same settings generating means comprises:
   means for using device environment configuration information of the development system recorded to the data storage medium as the same settings information without editing; and
   means for obtaining the same settings information from the device environment configuration information of the development system recorded to the data storage medium, except for information that changes based on the hardware specifications of the host computer of the specific system.

4. The device environment configuration system of claim 2, wherein the system-specific settings generating means comprises:
   an interface identification number detecting means for detecting the interface whereby a specific device in the specific system configuration is connected to the specific system and detecting the identification number of the detected interface.

5. The device environment configuration system of claim 4, wherein the interface detected by the interface identification number detecting means is a USB interface.

6. The device environment configuration system of claim 1, further comprising:
   a device environment configuration information storage means for recording and storing device environment configuration information in the development system configuration information managed by the operating system of the development system host computer to a data storage medium.

7. The device environment configuration system of claim 6, wherein the device environment configuration information storage means comprises:
   a data selection means for specifying one or a plurality of settings in the device environment configuration information to be recorded to the data storage medium;
   a device information detection means for finding the settings selected by the data selection means from the device environment configuration information; and
   a device information recording means for recording the settings found by the device information detection means to the specific data storage medium.

8. The device environment configuration system of claim 7, wherein the settings specified by the data selection means is all information in the device environment configuration information.

9. The device environment configuration system of claim 7, wherein the settings specified by the data selection means is device information for one or a plurality of devices in the device environment.

10. The device environment configuration system of claim 7, wherein the settings specified by the data selection means is device information for a desired device in the device environment, and device information for all devices connected to the desired device by a specific connection method.

11. A device environment configuration method, comprising:
   selectively specifying one or a plurality of settings in device environment configuration information to be recorded to a data storage medium;
   finding the settings selected by a data selection means from the device environment configuration information;
   recording the settings found by a device information detection means to the specific data storage medium; and automatically replicating device environment configuration information to a specific system, wherein the device environment configuration information is specific information contained in system configuration information managed by an operating system of a host computer development system used that develops a software application program to be run on the specific system to achieve specific functions.

12. The device environment configuration method of claim 11, wherein the device environment duplication step comprises:
(a) generating settings identical to the device environment settings of the host computer development system based on the device environment settings of the development system recorded to the data storage medium;
(b) generating system-specific settings that differ according to the specific system based on system configuration information managed by the host computer of the specific system; and
(c) storing the same settings generated by step (a) and the system-specific settings generated by step (b) in the system configuration information of the specific system as device environment settings for the specific system.

13. The device environment configuration method of claim 12, wherein generating settings identical to the device environment settings of the host computer development system based on the device environment settings of the development system recorded to the data storage medium, comprises:
using device environment configuration information of the development system recorded to the data storage medium as the same settings information without editing; and
using the device environment configuration information of the development system recorded to the data storage medium as the same settings information, except for information that changes based on the hardware specifications of the host computer of the specific system.

14. The device environment configuration method of claim 12, wherein generating system-specific settings that differ according to the specific system based on system configuration information managed by the host computer of the specific system, comprises:
detecting an interface whereby a specific device in the specific system configuration is connected to the specific system; and
detecting the identification number of the detected interface.

15. The device environment configuration method of claim 14, wherein the detected interface is a USB interface.

16. The device environment configuration method of claim 11, further comprising:
(d) recording and storing device environment configuration information in the development system configuration information managed by the operating system of the development system host computer to a data storage medium.

17. The device environment configuration method of claim 16, wherein recording and storing device environment configuration information in the development system configuration information managed by the operating system of the development system host computer to a data storage medium, comprises:
specifying one or a plurality of settings in the device environment configuration information to be recorded to the data storage medium;
finding the settings from the device environment configuration information; and
recording the settings to the specific data storage medium.

18. The device environment configuration method of claim 17, wherein specifying one or a plurality of settings in the device environment configuration information to be recorded to the data storage medium, comprises:
specifying all information in the device environment configuration information to be recorded to the data storage medium.

19. The device environment configuration method of claim 17, wherein specifying one or a plurality of settings in the device environment configuration information to be recorded to the data storage medium, comprises:
specifying device information for one or a plurality of devices in the device environment configuration information to be recorded to the data storage medium.

20. The device environment configuration method of claim 17, wherein specifying one or a plurality of settings in the device environment configuration information to be recorded to the data storage medium, comprises:
specifying device information for a desired device in the device environment, and device information for all devices connected to the desired device by a specific connection method to be recorded to the data storage medium.

21. A computer program product that executes a device environment configuration method, the computer program product comprising a data storage medium having computer-readable program code embodied therein, the computer program product comprising:
computer-readable program code that is configured to selectively specify one or a plurality of settings in device environment configuration information to be recorded to a data storage medium;
computer-readable program code that is configured to find the settings selected by a data selection means from the device environment configuration information;
computer-readable program code that is configured to record the settings found by a device information detection means to the specific data storage medium; and
computer-readable program code that is configured to automatically replicate device environment configuration information to a specific system,
wherein the device environment configuration information is specific information contained in system configuration information managed by an operating system of a host computer development system used to develop a software application program to be run on the specific system to achieve specific functions.

22. The computer program product of claim 21, wherein the computer-readable program code that is configured to automatically replicate device environment configuration information to a specific system, comprises:
(a) computer-readable program code that is configured to generate settings identical to the device environment settings of the host computer development system based on the device environment settings of the development system recorded to the data storage medium;
(b) computer-readable program code that is configured to generate system-specific settings that differ according to the specific system based on system configuration information managed by the host computer of the specific system; and
(c) computer-readable program code that is configured to store the same settings generated by step (a) and the system-specific settings generated by step (b) in the system configuration information of the specific system as device environment settings for the specific system.

23. The computer program product of claim 22, wherein computer-readable program code that is configured to generate settings, identical to the device environment settings of the host computer development system based on the device environment settings of the development system recorded to the data storage medium, comprises:
   computer-readable program code that is configured to use device environment configuration information of the development system recorded to the data storage medium as the same settings information without editing; and
   computer-readable program code that is configured to use the device environment configuration information of the development system recorded to the data storage medium as the same settings information, except for information that changes based on the hardware specifications of the host computer of the specific system.

24. The computer program product of claim 22, wherein computer-readable program code that is configured to generate system-specific settings that differ according to the specific system based on system configuration information managed by the host computer of the specific system, comprises:
   computer-readable program code that is configured to detect an interface whereby a specific device in the specific system configuration is connected to the specific system, and detect the identification number of the detected interface.

25. The computer program product of claim 24, wherein the detected interface is a USB interface.

26. The computer program product of claim 21, further comprising:
   (d) computer-readable program code that is configured to record and store device environment configuration information in the development system configuration information managed by the operating system of the development system host computer to a data storage medium.

27. The computer program product of claim 26, wherein computer-readable program code that is configured to record and store device environment configuration information in the development system configuration information managed by the operating system of the development system host computer to a data storage medium, comprises:
   computer-readable program code that is configured to specify one or a plurality of settings in the device environment configuration information to be recorded to the data storage medium;
   computer-readable program code that is configured to find the settings from the device environment configuration information; and
   computer-readable program code that is configured to record the settings to the specific data storage medium.

28. The computer program product of claim 27, wherein computer-readable program code that is configured to specify one or a plurality of settings in the device environment configuration information to be recorded to the data storage medium, comprises:
   computer-readable program code that is configured to specify all information in the device environment configuration information to be recorded to the data storage medium.

29. The computer program product of claim 27, wherein computer-readable program code that is configured to specify one or a plurality of settings in the device environment configuration information to be recorded to the data storage medium, comprises:
   computer-readable program code that is configured to specify device information for one or a plurality of devices in the device environment configuration information to be recorded to the data storage medium.

30. The computer program product of claim 27, wherein computer-readable program code that is configured to specify one or a plurality of settings in the device environment configuration information to be recorded to the data storage medium, comprises:
   computer-readable program code that is configured to specify device information for a desired device in the device environment, and device information for all devices connected to the desired device by a specific connection method to be recorded to the data storage medium.

31. A device environment configuration system, comprising:
   a device environment configuration information storage unit for recording and storing device environment configuration information in development system configuration information managed by an operating system of a development system host computer to a data storage medium, the device environment configuration information storage unit includes:
      a data selection component for selectively specifying one or a plurality of settings in the device environment configuration information to be recorded to the data storage medium;
      a device information detection component for finding the settings selected by the data selection component from the device environment configuration information; and
      a device information recording component for recording the settings found by the device information detection component to the specific data storage medium;
   a device environment duplication unit adapted to automatically replicate device environment configuration information to a specific system,
   wherein the device environment configuration information is specific information contained in system configuration information managed by an operating system of a host computer development system used to develop a software application program to be run on the specific system to achieve specific functions.

32. The device environment configuration system of claim 31, wherein the device environment duplication unit comprises:
   a same settings generating unit adapted to generate settings identical to the device environment settings of the host computer development system based on the device environment settings of the development system recorded to the data storage medium;
   a system-specific settings generating unit adapted to generate system-specific settings that differ according to the specific system based on system configuration information managed by the host computer of the specific system; and
   a settings storage unit adapted to store the same settings generated by the same settings generating unit and the system-specific settings generated by the system-specific settings generating unit in the system configuration information of the specific system as device environment settings for the specific system.

33. The device environment configuration system of claim 32, wherein the same settings generating unit, comprises:
 a first unit adapted to use device environment configuration information of the development system recorded to the data storage medium as the same settings information without editing; and
 a second unit adapted to obtain the same settings information from the device environment configuration information of the development system recorded to the data storage medium, except for information that changes based on the hardware specifications of the host computer of the specific system.

34. The device environment configuration system of claim 32, wherein the system-specific settings generating unit, comprises:
 an interface identification number detecting unit adapted to detect the interface whereby a specific device in the specific system configuration is connected to the specific system and to detect the identification number of the detected interface.

35. The device environment configuration system of claim 34, wherein the interface detected by the interface identification number detecting unit is a USB interface.

36. The device environment configuration system of claim 31, further comprising:
 a device environment configuration information storage unit adapted to record and store device environment configuration information in the development system configuration information managed by the operating system of the development system host computer to a data storage medium.

37. The device environment configuration system of claim 36, wherein the device environment configuration information storage unit comprises:
 a data selection unit adapted to specify one or a plurality of settings in the device environment configuration information to be recorded to the data storage medium;
 a device information detection unit adapted to find the settings selected by the data selection unit from the device environment configuration information; and
 a device information recording unit adapted to record the settings found by the device information detection unit to the specific data storage medium.

38. The device environment configuration system of claim 37, wherein the settings specified by the data selection unit is all information in the device environment configuration information.

39. The device environment configuration system of claim 37, wherein the settings specified by the data selection unit is device information for one or a plurality of devices in the device environment.

40. The device environment configuration system of claim 37, wherein the settings specified by the data selection unit is device information for a desired device in the device environment, and device information for all devices connected to the desired device by a specific connection method.

* * * * *